United States Patent

Bachman et al.

[15] 3,706,808

[45] Dec. 19, 1972

[54] PRODUCTION OF NITROALKANES

[72] Inventors: Gustave Bryant Bachman, Lafayette; Stephen E. Eisenstein, West Lafayette, both of Ind.

[73] Assignee: Purdue Research Foundation

[22] Filed: Oct. 18, 1971

[21] Appl. No.: 190,403

[52] U.S. Cl. .................. 260/644, 260/466, 260/467
[51] Int. Cl. ......................... C07c 79/04, C07c 79/08
[58] Field of Search...................... 260/466, 467, 644

[56] References Cited

UNITED STATES PATENTS 3,420,869  1/1969  Wekell et al. ........................ 260/467
3,510,531  5/1970  Larkin et al. ........................ 260/644
3,658,922  4/1972  Drake................................... 260/644

FOREIGN PATENTS OR APPLICATIONS 476,873  9/1951  Canada ............................... 260/644

*Primary Examiner*—Leland A. Sebastian
*Attorney*—Howard E. Post et al.

[57] ABSTRACT

A process for the production of a nitroalkane or dinitroalkane by reacting an olefin or diolefin with nitric acid in the presence of a lower aliphatic monocarboxylic acid anhydride, thereby producing a nitro-ester or dinitro-ester, and reducing the nitro-ester or dinitro-ester with an alkali borohydride to produce the nitroalkane or dinitroalkane.

5 Claims, No Drawings

PRODUCTION OF NITROALKANES

SUMMARY OF THE INVENTION

This invention relates to a process for the production of nitroalkanes. In a particular aspect, this invention relates to a process for the selective production of nitroalkanes from olefins and dinitroalkanes from diolefins.

It is known from Bordwell and Garbisch, J. Am. Chem. Soc. 82, 3588 (1960) to prepare acetyl nitrate by the addition of nitric acid to acetic anhydride in a mole ratio of 1:5–10 at a temperature of 20°–25°. The acetyl nitrate was isolated and reacted with olefins at −20° to produce nitroalkyl acetates and nitrates, along with nitroalkenes (acetyl nitrate must be handled with caution; violent decomposition may occur at 60°–70°C to dinitrogen pentoxide and lower oxides but it is reasonably stable at lower temperatures, especially when in dilute solution). It is also known from A. I. Meyers and J. C. Sircar, J. Org. Chem. 32, 4134 (1967) to reduce nitroalkenes to nitroalkanes with sodium borohydride.

Nitroalkanes are produced commercially by the vapor phase nitration of propane, which yields useful quantities of the four lower nitroalkanes plus very small amounts of 1- and 2-nitrobutanes. The nitration of alkanes of higher molecular weight than propane is impractical because the multiplicity of products makes separation and purification prohibitive in cost. A need exists therefore for a process whereby a nitroalkane can be produced selectively.

SUMMARY OF THE INVENTION

It is an object of this invention to provide a process for the production of nitroalkanes.

It is another object of this invention to provide a process for selectively producing a nitroalkane from an olefin.

It is still another object of this invention to provide a process for the selectively producing a dinitro-alkane from a diolefin.

Other objects of this invention will be apparent to those skilled in the art from the disclosure herein.

It is the discovery of the present invention to provide a process for producing a selected nitroalkane from a selected olefin or a selected dinitroalkane from a selected diolefin. According to the present invention, the selected olefin, or diolefin, is reacted with nitric acid in the presence of a lower aliphatic carboxylic acid anhydride thereby converting the olefin or diolefin to the corresponding nitroalkanol ester or dinitroalkanediol diester. The product so obtained is reacted with sodium borohydride thereby producing the nitroalkane or dinitroalkane. The process is particularly advantageous in that no substantial concentration of nitroolefin is produced and it is carried out in a single reaction vessel without isolation of intermediates, thereby minimizing operating costs and preventing reduced yield through loss of product. Furthermore, excess acid anhydride is not needed as a solvent, temperatures below those obtainable with an ice bath are not needed, and large concentrations of explosive acetyl nitrate are never present.

DETAILED DISCUSSION

Olefins and diolefins useful in the present invention correspond to the formula

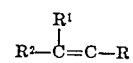

where R and $R^1$ can be hydrogen or alkyl, e.g., alkyl of one to three carbon atoms, and can be the same or different; $R^2$ is alkyl of one to six carbon atoms or $R^2$ can be the group $(R^1CH=CH)$—; or R and $R^2$ taken together can be an alkylene group, e.g., butylene, thereby forming a cyclohexene ring.

The nitroalkanes and dinitroalkanes obtained therefrom correspond to the formula

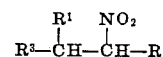

wherein R and $R^1$ have the same meaning defined above and $R^3$ is an alkyl group of one to six carbon atoms or the group

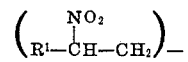

or R and $R^3$ taken together can collectively be a butylene group forming a cyclohexane ring.

The reaction is carried out in a vessel equipped with an agitation means, a temperature indicator, a cooling means, and an inlet means. The olefin is mixed with acid anhydride, e.g., acetic anhydride, in a ratio of about 1 to 2–4 moles of said anhydride (in a 1 to 4–8 moles ratio if the olefin is a diolefin). If the olefin is a 1-olefin, i.e. when R is hydrogen, concentrated sulfuric acid is preferably, but not necessarily, added at this point in a mole ratio of about 0.01–0.02:1 of the olefin to catalyze the reaction. The sulfuric acid should not be used with cyclohexene because the temperature is virtually uncontrollable in the presence of sulfuric acid. Nitric acid, about 1.5 moles per mole of olefin or 3 moles per mole of diolefin, preferably but not necessarily, an aqueous solution containing about 70 percent by weight $HNO_3$, is then added gradually with agitation, maintaining the temperature at, e.g., about 25° C. Generally the mixture is agitated for a time sufficient to insure substantial completeness of reaction, e.g. from 1–hours, thereby forming the nitro-ester.

To the solution is then gradually added sodium hydroxide in a mole ratio of about 0.9 mole per mole of acetic anhydride. Preferably the sodium hydroxide is in the form of a solution, e.g., an aqueous solution. Preferably the temperature of the reaction mixture is controlled to about 20° or below. To the resulting mixture is then added sodium borohydride in a mole ratio of about 1 mole per mole of olefin or 2 moles per mole of diolefin, dissolved in a suitable solvent, e.g., dimethylsulfoxide (hereafter designed DMSO), maintaining the temperature generally at about 20°–25°C.

Generally the mixture is agitated for a time to allow the reaction to go to completion, e.g., for about 30 min., and is then diluted with about 2 volumes of cold water and the product is extracted with ether. It is then recovered by any suitable means, e.g., by evaporation of the ether and steam distillation or vacuum distillation of the residue.

Olefins and diolefins useful for the practice of this invention are those corresponding to the foregoing general formula, i.e., those having from one to three active hydrogen atoms on the carbon atoms of the double bonds. Ethylene is inoperable because the addition of acyl nitrate does not occur. The ease of addition of the nitro group increases with the degree of substitution on the unsaturated carbon atoms, but the tetra-substituted olefins are inoperable because the addition compound cannot be reduced to nitro-alkane, i.e., no active hydrogen atoms are present. The ease of reduction of the addition product increases with decreasing degree of substitution. Typical olefins and diolefins preferred for the practice of this invention include but are not limited to 1-butene, 1-octene, 3,3-dimethyl-1-butene, cyclohexene, 2-butene, 2-methyl-1-butene, 2-methyl-2-butene, 1,3-butadiene and 2-methyl-2,4-pentadiene. Many other suitable olefins and diolefins are known.

The practice of the invention is not limited to the use of acetic anhydride, but inasmuch as the acid anhydride is consumed in the reaction and does not form a part of the product, it is generally impractical and uneconomical to employ others. The ordinary commercial grade acetic anhydride is suitable. Propionic anhydride has also been used with equivalent results, and butyric anhydride is similarly suitable.

Sodium borohydride is known in the art and is commercially available. The ordinary grade of commerce is suitable for the practice of this invention.

The invention will be better understood with reference to the following examples. It is understood however that these examples are intended for illustration only and it is not intended that the invention be limited thereby.

EXAMPLE 1

In a 250 ml three-necked flask was placed 25.0 ml (0.265 mole) of acetic anhydride and 15.6 ml (0.10 mole) of 1-octene. The mixture was cooled to 15° and 6.6 ml (0.1 mole) of 70 percent nitric acid was added dropwise. The reaction mixture was allowed to warm to room temperature and stirred for 4 hrs. The adduct was reduced in situ with 6.10 g (0.15 mole) of sodium borohydride in 130 ml DMSO, and bromobenzene was added as internal vapor phase chromatography (vpc) standard. The reaction mixture was stirred 1 hr and poured into ice water. The aqueous solution was extracted with 3 × 25 ml ether. Analysis via vpc showed a 34 percent conversion (46 percent yield) to 1-nitrooctane.

EXAMPLE 2

A three-necked flask was charged with 15.0 ml (0.159 mole) of acetic anhydride, 7.8 ml (0.05 mole) of 1-octene and 0.2 ml concentrated sulfuric acid cooled to 20°. Then 4.3 ml (0.065 mole) of 70 percent nitric acid was added dropwise. A vpc analysis at 15 min after the nitric acid addition was complete showed no unreacted acetic anhydride but a trace of 1-octene. Analysis at 4 hr showed only a slight decrease in the amount of 1-octene. The reduction was carried out at this point with 3.53 g (0.091 mole) of sodium borohydride in 75 ml of DMSO. Due to severe foaming, a few drops of Dow-Corning Antifoam Q were added and the reduction completed. The reaction mixture was stirred for 1 hr, quenched in water and extracted with 3 × 25 ml of ether. Bromobenzene was added to the ether layer as an internal vpc standard. Analysis by vpc showed a 53 percent conversion (58 percent yield) of 1-nitrooctane.

EXAMPLE 3

2-Methyl-1-butene, 21.4 g (0.3 mole), and 113 ml (1.2 mole) of acetic anhydride were placed in a 500 ml Morton flask, and 1 ml of sulfuric acid was added. Nitric acid (0.45 mole) was added through a pressure equalizing dropping funnel while maintaining the temperature between 20°–30° with an ice-water bath. The solution was stirred overnight, and a solution of 42 g (1.05 mole) of sodium hydroxide in 40 ml of water was added, while keeping the temperature below 20°. To this slurry was added 11.50 g (0.29 mole) of sodium borohydride in 210 ml of DMSO while keeping the temperature 20°–25°. The reaction mixture was stirred for 1 hr, quenched in water and extracted with ether. There was obtained 1-nitro-2-methylbutane.

EXAMPLE 4

A four-necked flask was charged with 32 ml (0.3 mole) of 2-methyl-2-butene, and 113 ml (1.2 mole) of acetic anhydride. Nitric acid (30 ml, 0.45 mole) was added from a non-pressure equalizing dropping funnel while keeping the temperature at 20°–30°; a condenser was used to prevent loss of the low boiling olefin. The solution was stirred until the exothermic phase was complete. To this solution was added 42 g (1.05 mole) sodium hydroxide in 45 ml of water while keeping the temperature below 20°. The resulting thick slurry was stirred for 0.5 hr and 11.84 g (0.30 g (0.30 mole) of sodium borohydride in 225 ml DMSO added at 20°–25°. The mixture was stirred for 1 hr and quenched in cold water. The aqueous mixture was extracted with 3 × 50 ml of ether.

Distillation gave 2-nitro-3-methylbutane, bp 58° (18 mm).

EXAMPLE 5

The foregoing experiment was repeated in all essential details except that the reduction step was effected at 60°. The addition went smoothly with no apparent reaction. After about 5–10 min some bubbling was noted and the reaction became vigorous, a stable foam formed and 5 ml DMSO were added to wash it down. The reaction mixture was stirred 1.5 hr, quenched in water and the product extracted with ether. The nitroalkane was then distilled, bp 58° (17 mm).

EXAMPLE 6

Nitric acid, 30 ml (0.45 mole), was added dropwise to 113 ml (1.2 mole) of acetic anhydride, and 30.5 ml (0.3 mole) of cyclohexene. The temperature was easily controlled at 20°–30°. The reaction was quenched in 600 ml of ice water, 100 ml of ether and 5 g urea were added. After extraction with ether, the ether layer was dried over magnesium sulfate. The ether was evaporated and the residue reduced with 11.34 g (0.29 mole) of sodium borohydride in 250 ml of DMSO. After stirring the reduction mixture for 1 hr, it was quenched in water and extracted with ether. The product was steam distilled, extracted with ether, dried, concentrated and vacuum distilled through a 13 cm Vigreux column. A good yield of nitrocyclohexane was obtained.

EXAMPLE 7

The experiment of Example 2 was repeated in all essential details except that 1-butene was substituted for 1-octene on an equi-molar basis. There was obtained 1-nitrobutane in good yield.

EXAMPLE 8

The experiment of Example 7 was repeated in all essential details except that 2-butene was substituted for 1-butene. There was obtained 2-nitrobutane in good yield.

EXAMPLE 9

The experiment of Example 2 was repeated in all essential details except that 3,3-dimethyl-1-butene was substituted for 1-octene on an equi-molar basis. There was obtained, 3,3-dimethyl-1-nitrobutane.

EXAMPLE 10

The experiment of Example 7 is repeated in all essential details except that 1,3-butadiene is substituted for 1-butene on a 1:2 mole ratio basis. There is obtained 1,4-dinitrobutane in good yield.

We claim:
1. A process for the selective production of a nitroalkane or dinitroalkane corresponding to the formula

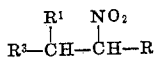

where R and $R^1$ are hydrogen or alkyl of one to three carbon atoms and $R^3$ is alkyl of one to six carbon atoms or the group

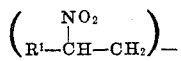

or R and $R^3$ taken together are collectively a butylene group, comprising the steps of a. mixing an olefin or diolefin corresponding to the formula

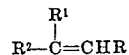

where R and $R^1$ have the same meaning as hereinbefore defined and $R^2$ is alkyl or the group ($R^1$CH=CH), or R and $R^2$ taken together are a butylene group, with a lower aliphatic carboxylic acid anhydride, said olefin being in a ratio of about 1 mole to 2–4 moles of said anhydride or about 1 mole of said diolefin to about 4–8 moles of said anhydride, b. adding nitric acid thereto at a ratio of about 1.5 moles per mole of said olefin, or 3 moles per mole of said diolefin, while maintaining the temperature at about 25°C, c. agitating for a length of time sufficient to substantially convert said olefin or diolefin to the corresponding nitro-alkanol ester or dinitroalkanediol diester, d. adding sodium hydroxide in a ratio of about 0.9 moles per mole of said anhydride while maintaining the temperature at about 20°C, adding sodium borohydride in a mole ratio of about 1:1 of said olefin or about 2:1 of said diolefin while maintaining the temperature at about 20°–25°C, and agitating for about 30 min, e. adding the mixture thereby obtained to about 2 volumes of cold water, f. and recovering said nitroalkane or dinitroalkane therefrom.

2. The process of claim 1 wherein said olefin is a diolefin.

3. The process of claim 1 wherein said acid anhydride is acetic anhydride.

4. The process of claim 1 wherein said olefin is a 1-olefin and step (b) is effected in the presence of sulfuric acid, 0.01–0.02 moles per mole of said olefin.

5. The process of claim 1 wherein said nitric acid is an aqueous solution containing 70% $HNO_3$.

* * * * *

UNITED STATES PATENT OFFICE
CERTIFICATE OF CORRECTION

Patent No. 3,706,808     Dated December 19, 1972

Inventor(s) Gustave B. Bachman and Stephen E. Eisenstein

It is certified that error appears in the above-identified patent and that said Letters Patent are hereby corrected as shown below:

Column 2, line 49 - "1-" should be --1-4--

Signed and sealed this 10th day of July 1973.

(SEAL)
Attest:

EDWARD M. FLETCHER, JR.  
Attesting Officer

Rene Tegtmeyer  
Acting Commissioner of Patents